(12) United States Patent
Choi et al.

(10) Patent No.: US 12,370,894 B2
(45) Date of Patent: Jul. 29, 2025

(54) RELAY CONTROL APPARATUS, BATTERY PACK AND ELECTRIC VEHICLE

(71) Applicant: LG Energy Solution, Ltd., Seoul (KR)

(72) Inventors: Ho-Been Choi, Daejeon (KR); Young-Min Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 311 days.

(21) Appl. No.: 18/028,902

(22) PCT Filed: Mar. 18, 2022

(86) PCT No.: PCT/KR2022/003850
§ 371 (c)(1),
(2) Date: Mar. 28, 2023

(87) PCT Pub. No.: WO2022/197161
PCT Pub. Date: Sep. 22, 2022

(65) Prior Publication Data
US 2023/0331091 A1    Oct. 19, 2023

(30) Foreign Application Priority Data

Mar. 18, 2021  (KR) .................. 10-2021-0035516

(51) Int. Cl.
*B60L 3/00* (2019.01)
*B60L 3/04* (2006.01)
(Continued)

(52) U.S. Cl.
CPC .............. *B60L 3/0084* (2013.01); *B60L 3/04* (2013.01); *H01H 47/005* (2013.01);
(Continued)

(58) Field of Classification Search
CPC ...... B60L 3/0084; B60L 3/04; H01M 47/005; H01M 47/32; H01M 10/425; H02J 9/061
See application file for complete search history.

(56) References Cited

U.S. PATENT DOCUMENTS

| 2003/0111911 | A1  | 6/2003 | Hsu |
| 2008/0186645 | A1* | 8/2008 | Morimoto ............ H01H 47/325 361/194 |
| 2013/0114178 | A1  | 5/2013 | Adachi et al. |
| 2014/0021961 | A1  | 1/2014 | Yamada et al. |

(Continued)

FOREIGN PATENT DOCUMENTS

| CN | 105515174 B | 4/2019 |
| CN | 110473742 A | 11/2019 |

(Continued)

OTHER PUBLICATIONS

International Search Report for PCT/KR2022/003850 mailed Jul. 15, 2022. 3 pgs.
(Continued)

*Primary Examiner* — Jared Fureman
*Assistant Examiner* — Duc M Pham
(74) *Attorney, Agent, or Firm* — Lerner David LLP (57) ABSTRACT

A relay control apparatus for a relay including a contact connected between a positive electrode of a battery and a load, and a coil connected between a relay power terminal and a ground in which the contact moves to a closed position when the coil is energized. The relay control apparatus includes a coil control switch which is turned on in response to a first switching signal having a voltage level that is equal to or higher than a first threshold voltage in response to a relay on-command, and a relay holding circuit configured to store emergency power using power supplied from the battery.

12 Claims, 4 Drawing Sheets

(51) Int. Cl.
  *H01H 47/00* (2006.01)
  *H01H 47/32* (2006.01)
  *H01M 10/42* (2006.01)
  *H02J 9/06* (2006.01)
(52) U.S. Cl.
  CPC .......... *H01H 47/32* (2013.01); *H01M 10/425* (2013.01); *H02J 9/061* (2013.01)

(56) References Cited

U.S. PATENT DOCUMENTS

| | | | | |
|---|---|---|---|---|
| 2018/0123363 | A1 | 5/2018 | Kim | |
| 2019/0362922 | A1* | 11/2019 | Bae | H02H 1/04 |
| 2020/0094680 | A1* | 3/2020 | Zeng | G06F 1/30 |
| 2021/0027961 | A1* | 1/2021 | Dan | B60L 3/12 |

FOREIGN PATENT DOCUMENTS

| | | | |
|---|---|---|---|
| DE | 10340701 | A1 | 3/2005 |
| JP | H08-233871 | A | 9/1996 |
| JP | H09-074780 | A | 3/1997 |
| JP | H11-227618 | A | 8/1999 |
| JP | 2002-044990 | A | 2/2002 |
| JP | 2004-217000 | A | 8/2004 |
| JP | 2011-113781 | A | 6/2011 |
| JP | 2012-182984 | A | 9/2012 |
| JP | 2013-101843 | A | 5/2013 |
| JP | 2013-127864 | A | 6/2013 |
| JP | 2014-020914 | A | 2/2014 |
| JP | 2015-95432 | A | 5/2015 |
| KR | 2018-0048068 | A | 5/2018 |
| KR | 2019-0084481 | A | 7/2019 |
| KR | 102118650 | B1 | 6/2020 |
| KR | 102134825 | B1 | 7/2020 |

OTHER PUBLICATIONS

Extended European Search Report including Written Opinion for Application No. 22771827.7 dated Mar. 26, 2024, pp. 1-9.

* cited by examiner

RELAY CONTROL APPARATUS, BATTERY PACK AND ELECTRIC VEHICLE

CROSS-REFERENCE TO RELATED APPLICATIONS

The present application is a national phase entry under 35 U.S.C. § 371 of International Application No. PCT/KR2022/003850 filed Mar. 18, 2022, which claims priority from Korean Patent Application No. 10-2021-0035516 filed Mar. 18, 2021, all of which are incorporated herein by reference.

TECHNICAL FIELD

The present disclosure relates to technology that delays the transition of a relay from a closed state to an open state in an emergency situation.

BACKGROUND ART

Recently, there has been a rapid increase in the demand for portable electronic products such as laptop computers, video cameras and mobile phones, and with the extensive development of electric vehicles, accumulators for energy storage, robots and satellites, many studies are being made on high performance batteries that can be recharged repeatedly.

Currently, commercially available batteries include nickel-cadmium batteries, nickel-hydrogen batteries, nickel-zinc batteries, lithium batteries and the like, and among them, lithium batteries have little or no memory effect, and thus they are gaining more attention than nickel-based batteries for their advantages that recharging can be done whenever it is convenient, the self-discharge rate is very low and the energy density is high.

To safely use a battery, a relay is connected between the battery and a load. The relay includes a contact and a coil, and the contact moves between a closed position and an open position by a magnetic force generated by the excitation of the coil.

The relay comes in various types, and among them, a normally open (NO)-relay is widely used for electric vehicles. The contact of the NO relay moves to the closed position only when the coil is energized, and otherwise, the contact is kept in the open position. When the contact is in the closed position, power is supplied from the battery to the load (for example, a motor of an electric vehicle), and when the contact is in the open position, the electrical connection between the battery and the load is disconnected.

A coil control switch for controlling the energization of the coil may include a high side switch, a low side switch or a combination thereof. The coil control switch is switched between an on state and an off state by a signal from a control circuit, for example, a micro control unit (MCU).

However, in case that the energization of the coil is unintentionally stopped by a loss of a signal from the control circuit to the coil control switch due to a failure (for example, power off) in the control circuit while the contact is kept in the closed position, the power supply from the battery to the load is shut off, causing huge safety hazards.

SUMMARY

Technical Problem

The present disclosure is designed to solve the above-described problem, and therefore the present disclosure is directed to providing a relay control apparatus for delaying the transition of a relay from a closed state to an open state in the event of a failure, for example, a loss of a signal from a control circuit to a coil control switch, and a battery pack and an electric vehicle.

These and other objects and advantages of the present disclosure may be understood by the following description and will be apparent from an embodiment of the present disclosure. In addition, it will be readily understood that the objects and advantages of the present disclosure may be realized by the means set forth in the appended claims and a combination thereof.

Technical Solution

A relay control apparatus according to an aspect of the present disclosure is for a relay including a contact connected between a positive electrode of a battery and a load; and a coil connected between a relay power terminal and a ground wherein the contact moves to a closed position when the coil is energized. The relay control apparatus includes a control circuit configured to output a first switching signal having a voltage level that is equal to or higher than a first threshold voltage in response to a relay on-command; a coil control switch connected between a first terminal of the coil and the relay power terminal or between an opposite second terminal of the coil and the ground, wherein the coil control switch is configured to turn on in response to the first switching signal; and a relay holding circuit configured to store emergency power using power supplied from the battery. The relay holding circuit is configured to output the first switching signal instead of the control circuit using the emergency power when the control circuit is unable to output the first switching signal.

The coil control switch may be an NPN transistor having a collector connected to the relay power, an emitter connected to the first or second terminal of the coil and a base connected to the control circuit.

The relay holding circuit may include a voltage divider connected between the positive electrode of the battery and the ground, and configured to generate an output voltage that is less than the voltage across the battery; a capacitor having a first terminal connected to the ground, wherein the emergency power is stored in the capacitor; and a first auxiliary switch connected between the voltage divider and an opposite terminal of the capacitor. In response to the first auxiliary switch being turned on, the capacitor is charged by the output voltage.

The first auxiliary switch may be an NPN transistor including a collector connected to an output node of the voltage divider, an emitter connected to a second terminal of the capacitor and a base connected to the control circuit.

The control circuit may be configured to output a second switching signal having a voltage level that is equal to or higher than a second threshold voltage to the base of the first auxiliary switch in response to the relay on-command. The first auxiliary switch may be configured to turn on in response to the second switching signal being received at the base of the first auxiliary switch.

The relay holding circuit may further include a discharge resistor connected between the base of the coil control switch and the emitter of the coil control switch.

The relay holding circuit may further include a first diode including an anode connected to the control circuit and a cathode connected to the base of the coil control switch.

The first diode may be a light emitting diode configured to output an optical signal in response to the first switching signal being outputted by the control circuit. The first auxiliary switch may be a photo transistor including a collector connected to an output node of the voltage divider, a base configured to receive the optical signal, and an emitter connected to a second terminal of the capacitor. The first auxiliary switch may be configured to turn on in response to the optical signal being received at the base of the first auxiliary switch.

The relay holding circuit may further include a second diode including an anode connected to a second terminal of the capacitor and a cathode connected to the base of the coil control switch.

The relay holding circuit may further include a second auxiliary switch which is a PNP transistor including an emitter connected to a second terminal of the capacitor, a collector connected to the base of the coil control switch and a base connected to the control circuit; and a pull-down resistor connected between the base of the second auxiliary switch and the ground. The control circuit may be configured to output a third switching signal having a voltage level that is equal to or higher than a third threshold voltage to the base of the second auxiliary switch. The second auxiliary switch may be configured to turn off in response to the third switching signal being outputted by the control circuit and turn on in response to the control circuit being unable to output the third switching signal.

A battery pack according to another aspect of the present disclosure includes the relay control apparatus of any of the embodiments described herein.

An electric vehicle according to still another aspect of the present disclosure includes the battery pack.

Advantageous Effects

According to at least one of the embodiments of the present disclosure, it is possible to delay the transition of the relay from the closed state to the open state in the event of a failure, for example, a loss of a signal from the control circuit to the coil control switch.

The effects of the present disclosure are not limited to the above-mentioned effects, and these and other effects will be clearly understood by those skilled in the art from the appended claims.

BRIEF DESCRIPTION OF THE DRAWINGS

The accompanying drawings illustrate exemplary embodiments of the present disclosure, and together with the detailed description of the present disclosure as described below, serve to provide a further understanding of the technical aspects of the present disclosure, and thus the present disclosure should not be construed as being limited to the drawings.

DETAILED DESCRIPTION

Hereinafter, exemplary embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and the illustrations shown in the drawings are just an exemplary embodiment of the present disclosure, but not intended to fully describe the technical aspects of the present disclosure, so it should be understood that a variety of other equivalents and modifications could have been made thereto at the time that the application was filed.

The terms including the ordinal number such as "first", "second" and the like, are used to distinguish one element from another among various elements, but not intended to limit the elements.

Unless the context clearly indicates otherwise, it will be understood that the term "comprises" when used in this specification, specifies the presence of stated elements, but does not preclude the presence or addition of one or more other elements. Additionally, the term "control unit" as used herein refers to a processing unit of at least one function or operation, and may be implemented in hardware and software either alone or in combination.

In addition, throughout the specification, it will be further understood that when an element is referred to as being "connected to" another element, it can be directly connected to the other element or intervening elements may be present.

Figure 1:
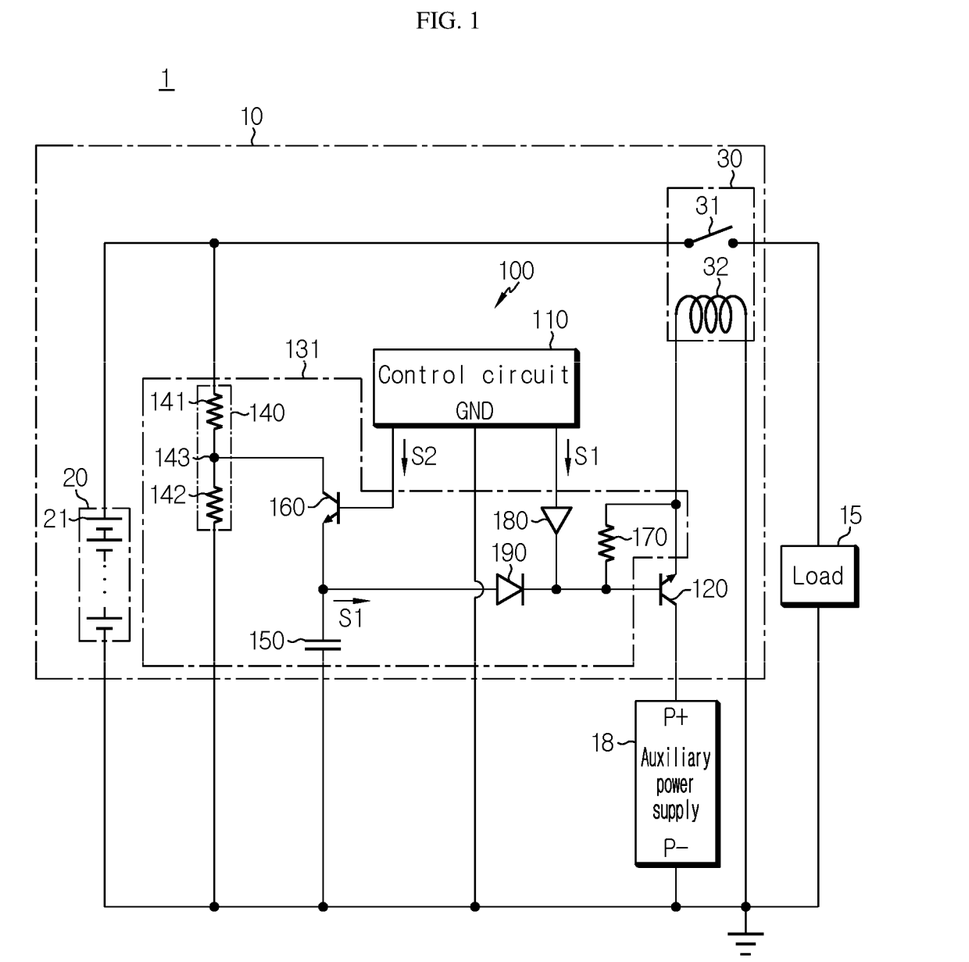
FIG. 1 is a reference diagram illustrating a relay control apparatus according to a first embodiment of the present disclosure.
Figure 2:
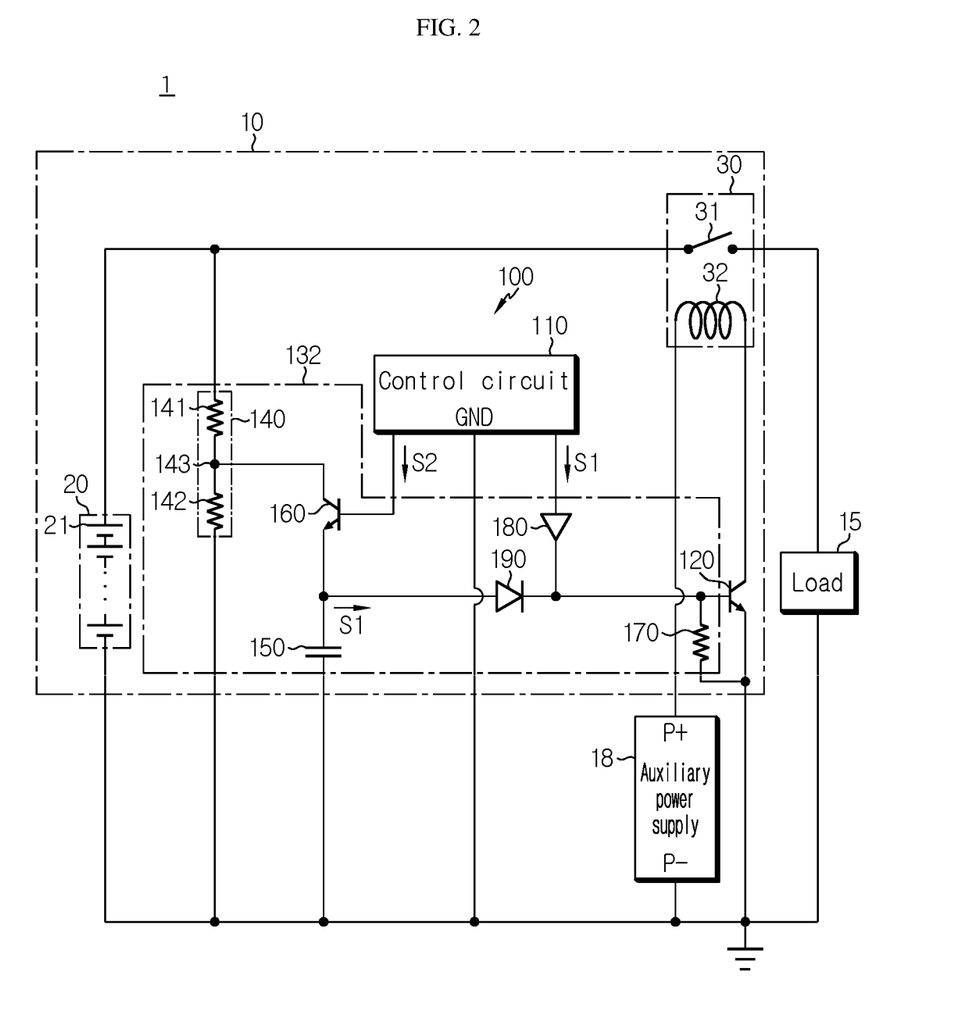
FIG. 2 is a reference diagram illustrating a relay control apparatus 100 according to a second embodiment of the present disclosure.

FIG. 1 is a reference diagram illustrating a relay control apparatus according to a first embodiment of the present disclosure, and FIG. 2 is a reference diagram illustrating a relay control apparatus 100 according to a second embodiment of the present disclosure.

Referring to FIGS. 1 and 2, an electric vehicle 1 includes a battery pack 10 and a load 15. The electric vehicle 1 may further include an auxiliary power supply 18.

The battery pack 10 may include a battery 20, a relay 30 and the relay control apparatus 100.

The battery 20 is provided to supply power to the load 15. The battery 20 includes at least one battery cell 21. The battery cell 21 may be, for example, a lithium ion battery cell. The battery cell 21 is not limited to a particular type and may include any battery cell that can be repeatedly recharged.

The relay 30 is provided to open and close a power supply path between the battery 20 and the load 15. The relay 30 may be a normally open (NO) relay. The relay 30 includes a contact 31 and a coil 32. When the coil 32 is de-energized, the contact 31 moves to an open position. When the coil 32 is energized, the contact 31 moves a closed position.

The coil 32 is connected between a relay power terminal and a ground. The relay power terminal may be an output terminal P+ of the auxiliary power supply 18 or a positive electrode terminal of the battery 20. For the auxiliary power supply 18, for example, a direct current voltage source such as a lead-acid battery may be used. FIG. 1 shows the auxiliary power supply 18 using the output terminal P+ for the relay power terminal by way of illustration. When a coil control switch 120 is turned on, the coil 32 is energized by the direct current voltage supplied through the relay power terminal.

The relay control apparatus 100 includes a control circuit 110, the coil control switch 120 and a relay holding circuit 131.

The coil control switch 120 is connected between one terminal of the coil 32 and the relay power terminal or between the other terminal of the coil 32 and the ground. For the coil control switch 120, an NPN transistor having a collector, an emitter and a base may be used.

FIG. 1 shows the coil control switch 120 connected between one terminal of the coil 32 and the relay power terminal, and the coil control switch 120 may be referred to as a 'high side switch'. When the coil control switch 120 is provided as the high side switch, the collector, the emitter and the base of the coil control switch 120 may be connected to the relay power terminal, one terminal of the coil 32 and the control circuit 110, respectively.

FIG. 2 shows the coil control switch 120 connected between the other terminal of the coil 32 and the ground, and in this case, the coil control switch 120 may be referred to as a 'low side switch'. When the coil control switch 120 is provided as the low side switch, the collector, the emitter and the base of the coil control switch 120 may be connected to the other terminal of the coil 32, the ground and the control circuit 110, respectively.

The control circuit 110 may be implemented, in hardware, including at least one of application specific integrated circuits (ASICs), digital signal processors (DSPs), digital signal processing devices (DSPDs), programmable logic devices (PLDs), field programmable gate arrays (FPGAs), microprocessors or electrical units for performing the other functions.

The control circuit 110 is configured to output a switching signal S1 to the coil control switch 120 in response to a relay on-command. The output of the switching signal S1 by the control circuit 110 may continue until a relay off-command is received. The control circuit 110 stops outputting the switching signal S1 in response to the relay off-command. The relay on-command and the relay off-command may be a signal transmitted from a user input device (not shown) provided in the electric vehicle 1. The user input device may be, for example, an ignition button of the electric vehicle 1.

The switching signal S1 may be a signal having a voltage level that is equal to or higher than a first threshold voltage. The first threshold voltage may be the minimum voltage necessary to form the base current which induces the turn on of the coil control switch 120. When the switching signal S1 is applied to the base of the coil control switch 120, the coil control switch 120 is turned on. When the coil control switch 120 is turned on, the coil 32 is energized and the contact 31 moves to the closed position.

The relay holding circuit 131 is configured to store emergency power using the power supplied from the battery 20. The emergency power stored in the relay holding circuit 131 is used to delay the transition of the relay 30 from the closed state to the open state. The relay holding circuit 131 includes a voltage divider 140, a capacitor 150 and an auxiliary switch 160. The relay holding circuit 131 may further include at least one of a diode 180, a diode 190 or a discharge resistor 170.

The voltage divider 140 is connected between the positive electrode of the battery 20 and the ground. The negative electrode of the battery 20 may be connected to the ground. The voltage divider 140 may be a series circuit of a resistor 141 having a first resistance value and a resistor 142 having a second resistance value. The voltage divider 140 is configured to generate an output voltage that is a fraction of the voltage across the battery 20 divided at a predetermined ratio. For example, when the first resistance value is 9 times larger than the second resistance value, $9/10$ of the battery voltage is applied across the resistor 141, and $1/10$ of the battery voltage is applied across the resistor 142. The output voltage of the voltage divider 140 refers to the voltage across the resistor 142.

The capacitor 150 is charged by the battery 20 to store emergency power. One terminal of the capacitor 150 is connected to the ground, and the other terminal of the capacitor 150 is connected to an output node 143 of the voltage divider 140 through the auxiliary switch 160. The output node 143 of the voltage divider 140 may be a connection node of the resistor 141 and the resistor 142. When the voltage of the emergency power stored in the capacitor 150 is higher than the first threshold voltage, the capacitor 150 outputs the switching signal S1 together with the control circuit 110 or instead of the control circuit 110 using the emergency power stored in the capacitor 150 until the voltage across the capacitor 150 is reduced below the first threshold voltage.

The auxiliary switch 160 is connected between the voltage divider 140 and the other terminal of the capacitor 150, and opens and closes the power supply path between the output node 143 of the voltage divider 140 and the capacitor 150. For a first protection switch, an NPN transistor having a collector, an emitter and a base may be used. The collector, the emitter and the base of the auxiliary switch 160 may be connected to the output node 143 of the voltage divider 140, the other terminal of the capacitor 150 and the control circuit 110, respectively.

The control circuit 110 is configured to output a switching signal S2 to the base of the auxiliary switch 160 independently of the switching signal S1. The control circuit 110 may output the switching signal S2 having a predetermined duty ratio (for example, 39%) for a predetermined time in response to the relay on-command. The switching signal S2 is a signal having a voltage level that is equal to or higher than a second threshold voltage. The second threshold voltage may be the minimum voltage necessary to form the base current which induces the turn on of the first protection switch. When the switching signal S2 is applied to the base of the auxiliary switch 160, the first protection switch is turned on.

The diode 180 is connected between the control circuit 110 and the coil control switch 120. An anode of the diode 180 may be connected to the control circuit 110, and a cathode of the diode 180 may be connected to the base of the coil control switch 120. The diode 180 serves as a delivery path of the switching signal S1 from the control circuit 110 to the coil control switch 120.

The diode 190 is connected between the capacitor 150 and the coil control switch 120. An anode of the diode 190 may be connected to the other terminal of the capacitor 150, and a cathode of the diode 190 may be connected to the base of the coil control switch 120. The diode 190 serves as a delivery path of the switching signal S1 from the capacitor 150 to the coil control switch 120.

The discharge resistor 170 is connected between the base and the emitter of the coil control switch 120. The discharge resistor 170 is provided to discharge the capacitor 150. The duration of the output switching signal S1 of the capacitor 150 relies on a time constant which is equal to the product of the multiplication of the voltage of the capacitor 150, the resistance value of the discharge resistor 170 and the capacitance of the capacitor 150.

Figure 3:
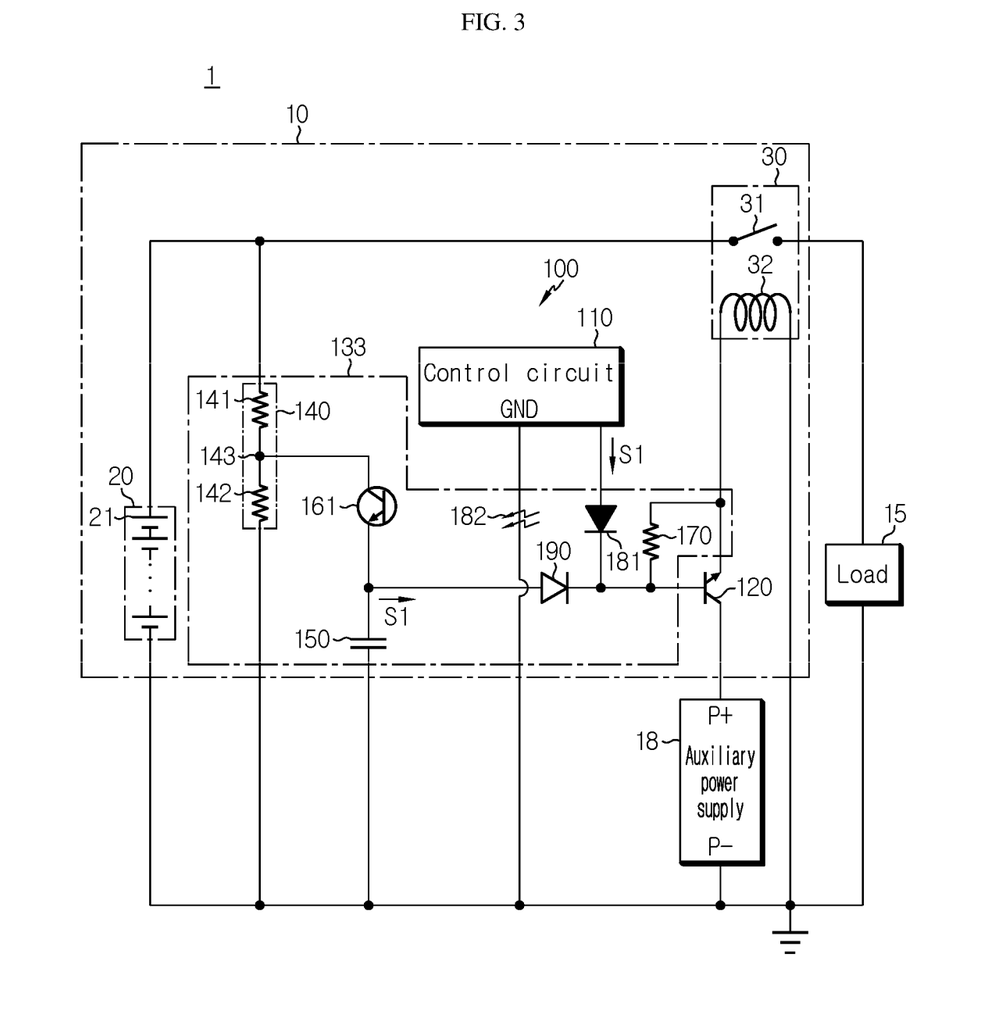
FIG. 3 is a reference diagram illustrating a relay control apparatus according to a third embodiment of the present disclosure.

FIG. 3 is a reference diagram illustrating a relay control apparatus according to a third embodiment of the present disclosure. Although FIG. 3 shows the coil control switch 120 used as the high side switch (see FIG. 1) for convenience of description, the coil control switch 120 may be used as the low side switch (see FIG. 2).

A relay holding circuit 133 of the relay control apparatus 100 according to the third embodiment of the present disclosure is identical to the first embodiment except that the control circuit 110 does not output the switching signal S2, and instead, outputs the switching signal S1 to store emergency power in the capacitor 150, a light emitting diode 181 is used as the diode 180, a photo transistor 161 is used as the auxiliary switch 160, and a signal delivery path between the control circuit 110 and the photo transistor 161 is removed. The following description is made based on difference(s) between this embodiment and the first embodiment.

Referring to FIG. 3, when the control circuit 110 outputs the switching signal S1, in the same way as the first embodiment, the coil control switch 120 is turned on by the switching signal S1. At the same time, the forward voltage by the switching signal S1 is applied across the diode 181, and an optical signal 182 is outputted from the diode 181. When the optical signal 182 is received at the base of the photo transistor 161, the photo transistor 161 is turned on. When the photo transistor 161 is turned on, a charging path from the voltage divider 140 to the capacitor 150 is provided.

According to the third embodiment, energization of the coil 32 and charging of the capacitor 150 is simultaneously carried out by the output of the switching signal S1 by the control circuit 110. As a result, it is possible to reduce the power consumption required to output the switching signal S2 and reduce the circuit complexity.

FIG. 3 is a reference diagram illustrating a relay control apparatus according to a fourth embodiment of the present disclosure. Although FIG. 4 shows the coil control switch 120 used as the high side switch (see FIG. 1) for convenience of description, the coil control switch 120 may be used as the low side switch (see FIG. 2).

A relay holding circuit 134 of the relay control apparatus 100 according to the fourth embodiment is identical to the first embodiment except that the relay holding circuit 134 is configured to output the switching signal S1 instead of the control circuit 110 only when an abnormal loss of the switching signal S1 from the control circuit 110 occurs. The following description is made based on difference(s) between this embodiment and the first embodiment.

Figure 4:
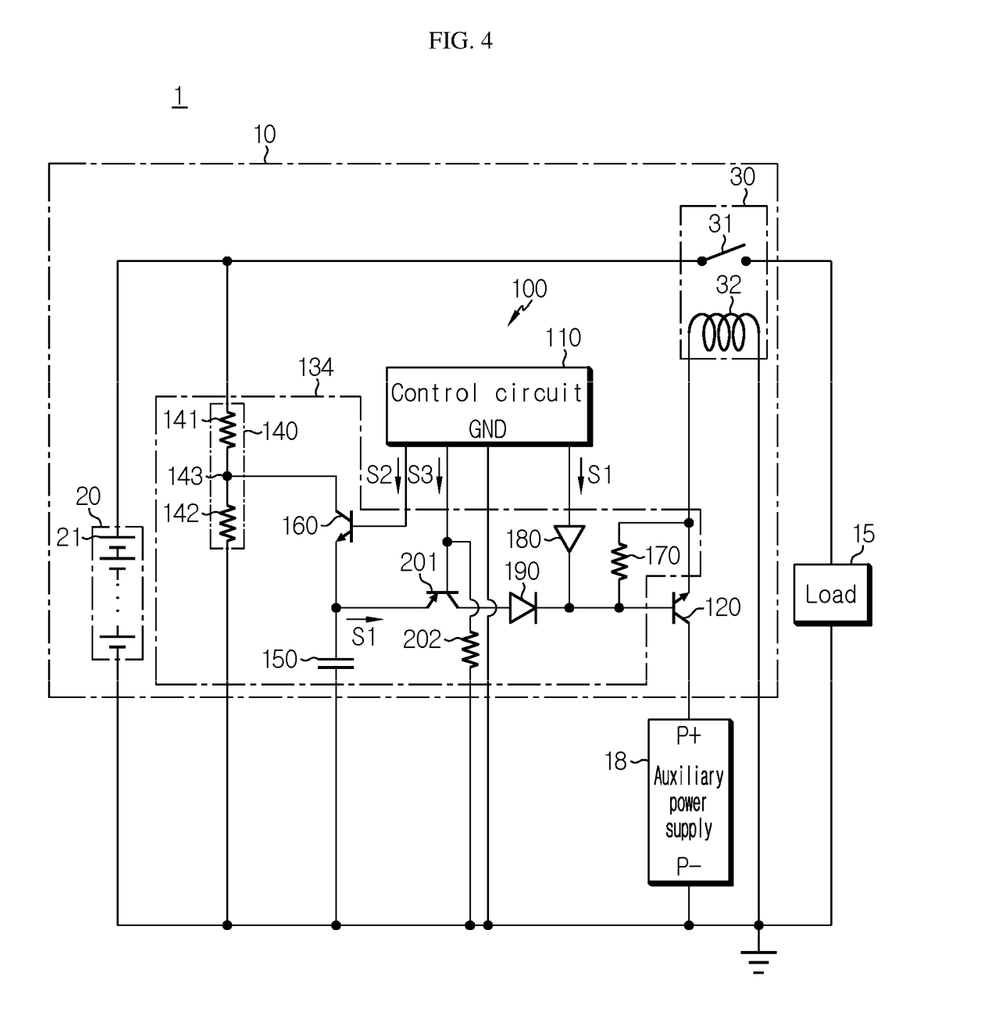
FIG. 4 is a reference diagram illustrating a relay control apparatus according to a fourth embodiment of the present disclosure.

Referring to FIG. 4, the relay holding circuit 134 of the relay control apparatus 100 according to the fourth embodiment further includes an auxiliary switch 201 and a pull-down resistor 202.

For the auxiliary switch 201, a PNP transistor having a collector, an emitter and a base may be used. The collector, the emitter and the base of the auxiliary switch 201 may be connected to the other terminal of the capacitor 150, the base of the coil control switch 120 and the control circuit 110, respectively.

The pull-down resistor 202 is connected between the base of the auxiliary switch 201 and the ground.

During normal operation, the control circuit 110 outputs a switching signal S3 having a voltage level that is equal to or higher than a third threshold voltage to the base of the auxiliary switch 201. The third threshold voltage may be the minimum voltage necessary to shut off the base current which induces the turn on of the auxiliary switch 201. When the switching signal S3 is applied to the base of the auxiliary switch 201, the auxiliary switch 201 is turned off.

Accordingly, when the control circuit 110 normally stops outputting the switching signal S1, the capacitor 150 is electrically separated from the coil control switch 120 by the switching signal S3, and thus the relay 30 may immediately move from the closed state to the open state.

In contrast, in case that the control circuit 110 is malfunctioning (for example, power off), the switching signal S1 and the switching signal S2 as well as the switching signal S3 is not outputted from the control circuit 110. In this case, the voltage of 0 V is applied to the base of the auxiliary switch 201 connected to the ground through the pull-down resistor 202, and the auxiliary switch 201 is turned on. As a result, in case that the output of the switching signal S1 by the control circuit 110 is suddenly stopped due to the malfunction of the control circuit 110 while the relay 30 is being controlled into the closed state, the coil 32 temporarily stays energized by the switching signal S1 immediately outputted from the relay holding circuit 134, and the transition of the relay 30 from the closed state to the open state is delayed.

When the control circuit 110 normally stops outputting the switching signal S1 in response to the relay off-command, the relay control apparatus 100 according to the fourth embodiment may block the signal path from the relay holding circuit 131 to the coil control switch 120 to avoid unnecessary delay in the transition of the relay 30 from the closed state to the open state.

While the present disclosure has been hereinabove described with regard to a limited number of embodiments and drawings, the present disclosure is not limited thereto and it is obvious to those skilled in the art that a variety of modifications and changes may be made thereto within the technical aspects of the present disclosure and the scope of the appended claims and equivalents thereof.

Additionally, as many substitutions, modifications and changes may be made to the present disclosure described hereinabove by those skilled in the art without departing from the technical aspects of the present disclosure, the present disclosure is not limited by the above-described embodiments and the accompanying drawings, and all or some of the embodiments may be selectively combined to allow various modifications.

DESCRIPTION OF REFERENCE NUMERALS

1: Electric vehicle
10: Battery pack
15: Load
20: Battery
30: Relay
100: Relay control apparatus
110: Control circuit
120: Coil control switch
131, 132, 133, 134: Relay holding circuit

What is claimed is:

1. A relay control apparatus for a relay including a contact connected between a positive electrode of a battery and a load; and a coil connected between a relay power terminal and a ground wherein the contact moves to a closed position when the coil is energized, the relay control apparatus comprising:
   a control circuit configured to output a first switching signal having a voltage level that is equal to or higher than a first threshold voltage in response to a relay on-command;
   a coil control switch connected between a first terminal of the coil and the relay power terminal or between an opposite second terminal of the coil and the ground, wherein the coil control switch is configured to turn on in response to the first switching signal; and a relay holding circuit configured to store emergency power using power supplied from the battery, wherein the relay holding circuit is configured to output the first switching signal instead of the control circuit using the emergency power when the control circuit is unable to output the first switching signal.

2. The relay control apparatus according to claim 1, wherein the coil control switch is an NPN transistor having a collector connected to the relay power, an emitter connected to the first or second terminal of the coil and a base connected to the control circuit.

3. The relay control apparatus according to claim 2, wherein the relay holding circuit includes:
   a voltage divider connected between the positive electrode of the battery and the ground, and configured to generate an output voltage that is less than the voltage across the battery;
   a capacitor having a first terminal connected to the ground, wherein the emergency power is stored in the capacitor; and
   a first auxiliary switch connected between the voltage divider and an opposite terminal of the capacitor,
   wherein in response to the first auxiliary switch being turned on, the capacitor is charged by the output voltage.

4. The relay control apparatus according to claim 3, wherein the first auxiliary switch is an NPN transistor including a collector connected to an output node of the voltage divider, an emitter connected to a second terminal of the capacitor and a base connected to the control circuit.

5. The relay control apparatus according to claim 4, wherein the control circuit is configured to output a second switching signal having a voltage level that is equal to or higher than a second threshold voltage to the base of the first auxiliary switch in response to the relay on-command, and
   wherein the first auxiliary switch is configured to turn on in response to the second switching signal being received at the base of the first auxiliary switch.

6. The relay control apparatus according to claim 3, wherein the relay holding circuit further includes a discharge resistor connected between the base of the coil control switch and the emitter of the coil control switch.

7. The relay control apparatus according to claim 3, wherein the relay holding circuit further includes a first diode including an anode connected to the control circuit and a cathode connected to the base of the coil control switch.

8. The relay control apparatus according to claim 7, wherein the first diode is a light emitting diode configured to output an optical signal in response to the first switching signal being outputted by the control circuit,
   wherein the first auxiliary switch is a photo transistor including a collector connected to an output node of the voltage divider, a base configured to receive the optical signal, and an emitter connected to a second terminal of the capacitor, and
   wherein the first auxiliary switch is configured to turn on in response to the optical signal being received at the base of the first auxiliary switch.

9. The relay control apparatus according to claim 3, wherein the relay holding circuit further includes a second diode including an anode connected to a second terminal of the capacitor and a cathode connected to the base of the coil control switch.

10. The relay control apparatus according to claim 3, wherein the relay holding circuit further includes:
    a second auxiliary switch which is a PNP transistor including an emitter connected to a second terminal of the capacitor, a collector connected to the base of the coil control switch and a base connected to the control circuit; and
    a pull-down resistor connected between the base of the second auxiliary switch and the ground,
    wherein the control circuit is configured to output a third switching signal having a voltage level that is equal to or higher than a third threshold voltage to the base of the second auxiliary switch, and
    wherein the second auxiliary switch is configured to:
    turn off in response to the third switching signal being outputted by the control circuit; and
    turn on in response to the control circuit being unable to output the third switching signal.

11. A battery pack comprising the relay control apparatus according to claim 1.

12. An electric vehicle comprising the battery pack according to claim 11.

* * * * *